United States Patent
Sakashita et al.

(10) Patent No.: US 9,575,595 B2
(45) Date of Patent: Feb. 21, 2017

(54) MUTUAL CAPACITANCE TOUCH PANEL

(71) Applicant: Nissha Printing Co., Ltd., Kyoto-shi (JP)

(72) Inventors: Asako Sakashita, Kyoto (JP); Kazuto Nakamura, Kyoto (JP); Tomohiro Yamaoka, Kyoto (JP); Keisuke Saito, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 14/898,922

(22) PCT Filed: Jun. 5, 2014

(86) PCT No.: PCT/JP2014/064950
§ 371 (c)(1),
(2) Date: Dec. 16, 2015

(87) PCT Pub. No.: WO2015/001901
PCT Pub. Date: Jan. 8, 2015

(65) Prior Publication Data
US 2016/0370942 A1    Dec. 22, 2016

(30) Foreign Application Priority Data
Jul. 1, 2013    (JP) ................. 2013-138367

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01); *G06F 2203/04103* (2013.01); *G06F 2203/04104* (2013.01); *G06F 2203/04111* (2013.01)

(58) Field of Classification Search
CPC .................. G06F 3/0418; G06F 3/044; G06F 2203/04103; G06F 2203/04104; G06F 2203/04111
See application file for complete search history.

(56) References Cited

U.S. PATENT DOCUMENTS

2010/0066692 A1    3/2010 Noguchi et al.
2010/0300862 A1*   12/2010 Tamura ................. G06F 3/0412
                                                          200/600
(Continued)

FOREIGN PATENT DOCUMENTS

JP    201072743 A    4/2010
JP    2011175972 A    9/2011
(Continued)

*Primary Examiner* — Tom Sheng
(74) *Attorney, Agent, or Firm* — The Webb Law Firm

(57) ABSTRACT

A mutual capacitance touch panel includes a substrate (4), a plurality of lower electrodes (10) provided in a form of wide bands formed of transparent conductive material and arranged parallel with each other and with narrow spacing therebetween along a first direction on a first face of the substrate (4), a plurality of upper electrodes (20) provided in a form of narrow bands formed of transparent conductive material and arranged parallel with each other and with wide spacing therebetween along a second direction intersecting the first direction on the first face of the substrate (4) and on the lower electrodes, and an insulating film (3) formed of photosensitive resin having adhesiveness and arranged between the upper electrodes (20) and the lower electrodes (10) to support the upper electrodes (20). The insulating film (3) includes a sloped side face (3b) sharing a long side with a support face (3a) which supports the upper electrode (20).

9 Claims, 7 Drawing Sheets

(56) References Cited

U.S. PATENT DOCUMENTS

| | | | |
|---|---|---|---|
| 2011/0147054 A1* | 6/2011 | Yamazaki | G02F 1/13439 174/254 |
| 2011/0165514 A1 | 7/2011 | Yamazaki | |
| 2012/0062481 A1* | 3/2012 | Kim | G06F 3/044 345/173 |
| 2013/0057501 A1 | 3/2013 | Nagata et al. | |
| 2013/0329401 A1* | 12/2013 | Yamamoto | G02B 5/0247 362/97.2 |
| 2015/0015801 A1* | 1/2015 | Kim | G03F 7/30 349/12 |

FOREIGN PATENT DOCUMENTS

| | | |
|---|---|---|
| JP | 201243460 A | 3/2012 |
| WO | 2005114369 A2 | 12/2005 |
| WO | 2010021224 A1 | 2/2010 |
| WO | 2012014745 A1 | 2/2012 |

* cited by examiner

Fig.3A
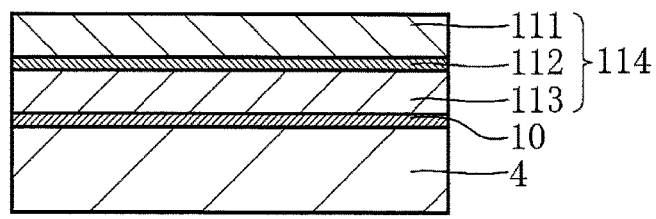
Fig.3B
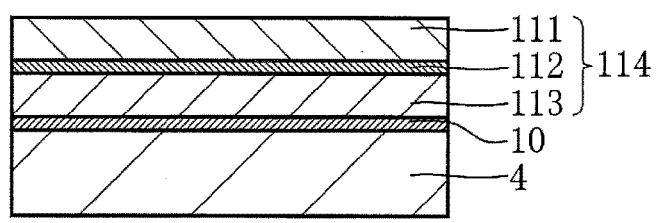
Fig.3C
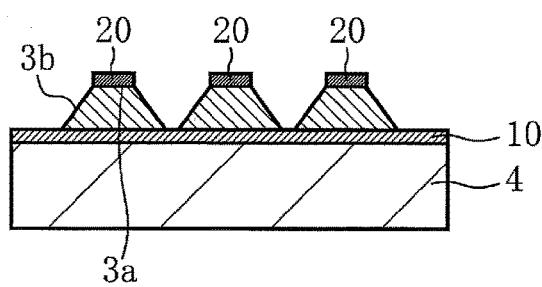
Fig.4
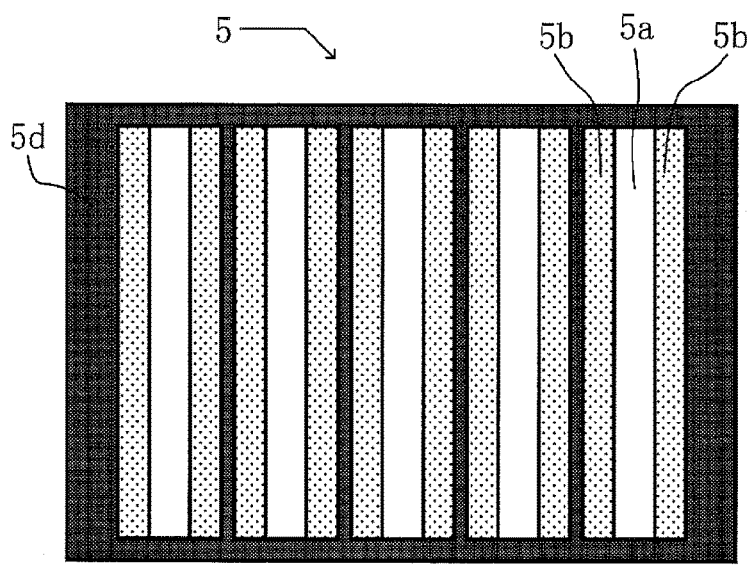

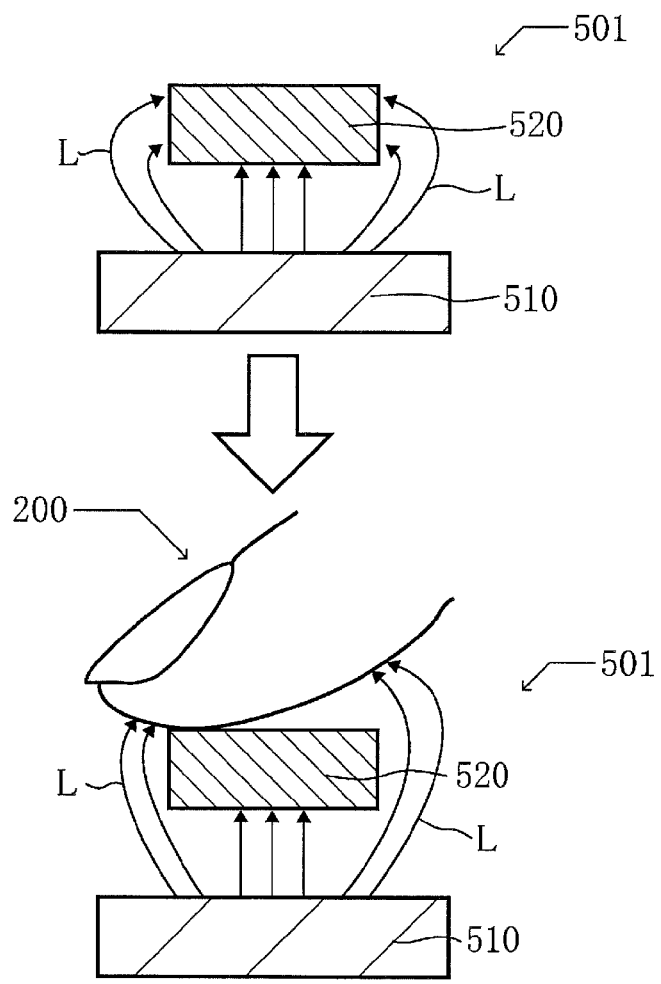

MUTUAL CAPACITANCE TOUCH PANEL

CROSS-REFERENCE TO RELATED APPLICATIONS

This application is the United States national phase of International Application No. PCT/JP2014/064950 filed Jun. 5, 2014, and claims priority to Japanese Patent Application No. 2013-138367 filed Jul. 1, 2013, the disclosures of which are hereby incorporated in their entirety by reference.

TECHNICAL FIELD

The present invention relates to a mutual capacitance touch panel configured to detect a position on a panel touched by an operating object such as a finger by the mutual capacitance technique.

BACKGROUND ART

As capacitance touch panels, there are two types, i.e. the surface type and the projection type. The capacitance touch panels are configured to specify a detection point by determining a change in capacitance which occurs when the surface of the touch panel is touched by an operating object such as a finger. The surface type can detect only one point at a time, whereas the projection type can specify coordinates of a detection point through determination of change in capacitance with utilization of electrodes which are arranged to intersect the X direction and the Y direction. For this reason, many electronic devices employ the projection type.

Further, the projection type includes a self capacitance type and a mutual capacitance type which differ in the method of detecting change in capacitance. The mutual capacitance type configured to specify a detection point directly when a change in mutual capacitance is detected through determination of mutual capacitance between an X electrode and a Y electrode is superior to the self capacitance type for multiple point detection applications. Therefore, electronic devices implementing a user interface contemplating multiple point detection employ the mutual capacitance type (see e.g. Patent Document 1).

Here, an electrode configuration of a conventional mutual capacitance type touch panel is illustrated in the schematic diagram of FIG. 9. As shown in FIG. 9, a touch panel 501 includes a plurality of lower electrodes 510 arranged parallel with each other along the X direction and a plurality of upper electrodes 520 arranged parallel with each other along the Y direction to intersect (perpendicular to) the respective lower electrodes. The upper electrodes 520 and the lower electrodes 510 are formed by etching a thin film made of a transparent conductive material (e.g. ITO, indium oxide, tin oxide, etc.) in the form of band-like electrodes separated from each other.

As shown in the schematic diagram of FIG. 10, the lower electrode 510 functions as a transmitter-side electrode, whereas the upper electrode 520 functions as a receiver-side electrode. When an object 200 such as a finger is not in contact with or not in the vicinity of the upper electrode 520 side, that is, the touch surface side, there is formed an electric field whose electric force lines L extend from the transmitter-side lower electrode 510 toward the receiver-side upper electrode 520. When the object 200 such as a finger approaches the upper electrode 520 to such an extent to affect the above electric field, some of the electric force lines L will travel around the upper electrode 520 to be absorbed by this object such as a finger. As a result, a change occurs in the mutual capacitance, and coordinates of this change can be detected as a detection point. Incidentally, in order to eliminate noise influence from LCD, the width of the lower electrode 510 is set wider than that of the upper electrode 520. Conversely, the spacing between adjacent lower electrodes 510 is set narrower than the spacing between adjacent upper electrodes 520.

Further, as a method of forming an electrode pattern in such a device as a flat panel display, a touch panel, a solar cell, etc., a commonly employed method is such that after a thin film made of transparent conductive material (transparent conductive film) is formed by the sputtering technique, a resist pattern is formed by the lithography and then a predetermined portion of the transparent conductive film is removed by the wet etching technique, thereby forming an electrode pattern.

In recent years, however, in consideration to costs or the like, attempts have been made to form a transparent electrode pattern with using a material other than ITO, indium oxide, or tin oxide (e.g. conductive ink containing conductive fibers such as silver nano fibers). For instance, in Patent Document 2, there is disclosed a method as follows. Namely, there is employed a photosensitive conductive film (dry film resist) comprising a conductive layer 12 containing conductive nano fibers and a photosensitive resin layer 13, which layers are laminated one after another on a support film 11. Then, the above resultant assembly is laminated on a substrate 45 with the photosensitive resin layer 13 of the assembly being placed in gapless contact therewith (FIG. 11A), after which the photosensitive resin layer 13 is exposed with irradiation of active beam L2 thereon (FIG. 11B) and then the photosensitive resin layer 13 is developed (FIG. 11C), thereby to form a photosensitive resin layer 13b and a conductive layer 12a in the form of a pattern.

PRIOR ART DOCUMENTS

Patent Documents

Patent Document 1: Japanese Unexamined Patent Application Publication No. 2012-43460
Patent Document 2: Japanese Unexamined Patent Application Publication No. 2011-175972

SUMMARY OF THE INVENTION

Problem to be Solved by Invention

However, if an upper electrode of a mutual capacitance touch panel 501 is obtained by employing the electrode pattern forming method disclosed in Patent Document 2, as shown in FIG. 12, the total thickness of the upper electrode 52 and the insulating layer 503 consisting of the photosensitive resin supporting this upper electrode 52 will be as large as 10 µm approximately. Further, the edges of these parts extend perpendicularly. As a result, there occurs a phenomenon so-called "visible-pattern phenomenon" (also called "visible-skeleton phenomenon") that the boundary between the portion where the upper electrode 520 is formed and the portion where no upper electrode 520 is formed becomes distinctly visible, so that the electrode pattern of the upper electrodes 520 will become visible from the touch surface side. Such visible-pattern phenomenon can sometimes provide unwanted visual effect to an image which is to be seen through the touch panel in an electronic device. Thus, there is a need for lessening the visible-pattern phenomenon.

Accordingly, an object of the present invention is to provide a solution to the above problem and to provide a mutual capacitance touch panel capable of lessening the visible-pattern phenomenon of an electrode pattern of upper electrodes.

Solution

For accomplishing the above-noted object, the present invention configures as follows.

According to a first feature of the present invention, there is provided a mutual capacitance touch panel which comprises:

a substrate;

a plurality of lower electrodes provided in a form of wide bands formed of transparent conductive material and arranged parallel with each other and with narrow spacing therebetween along a first direction on a first face of the substrate;

a plurality of upper electrodes provided in a form of narrow bands formed of transparent conductive material and arranged parallel with each other and with wide spacing therebetween along a second direction intersecting the first direction on the first face of the substrate and on the lower electrodes; and an insulating film formed of photosensitive resin having adhesiveness and arranged between the upper electrodes and the lower electrodes to support the upper electrodes, the insulating film including a sloped side face sharing a long side with a support face which supports the upper electrode.

According to a second feature of the present invention, there is provided a mutual capacitance touch panel according to the first feature, wherein the insulating film at a portion thereof supporting the upper electrode has a thickness (T) ranging from 3 to 15 μm.

According to a third feature of the present invention, there is provided a mutual capacitance touch panel according to the first feature or the second feature, wherein a normal line at a center portion of the sloped side face and a normal line of the support face form a slope θ ranging from 20 to 30 degrees therebetween.

According to a fourth feature of the present invention, there is provided a mutual capacitance touch panel according to any one of the first through third features, wherein the insulating film is formed for each one of the upper electrodes.

According to a fifth feature of the present invention, there is provided a mutual capacitance touch panel according to any one of the first through third features, wherein the insulating film is formed as one continuous film and includes a recessed bottom face interconnecting lower sides of the sloped side faces.

According to a sixth feature of the present invention, there is provided a mutual capacitance touch panel according to the fifth feature, wherein the sloped side face includes an upper side and a lower side and a height difference (D) between the upper side and the lower side is 1 μm or more.

Effects of the Invention

According to the present invention, in a mutual capacitance touch panel having an insulating film disposed between upper electrodes and lower electrodes to support the upper electrodes, this insulating film includes a sloped side face sharing a long side with a support face which supports the upper electrode. This arrangement renders gentler or smoother a change of refractive index between the portion where the upper electrode is formed and the portion where no upper electrode is formed. As a result, the boundary of the upper electrode is made less conspicuous. Accordingly, in a mutual capacitance touch panel, the visible-pattern phenomenon of an electrode pattern of upper electrodes can be lessened.

BRIEF DESCRIPTION OF DRAWINGS

FIG. 3 is a view showing one example of step of forming upper electrodes and sloped side faces, FIG. 4 is a plane view of a mask used at an exposing step shown in FIG. 3, FIG. 10 is a schematic section illustrating a detection principle of the touch panel shown in FIG. 9.

EMBODIMENTS OF THE INVENTION

Next, embodiments of the present invention will be explained with reference to the accompanying drawings.

First Embodiment

Configuration of Touch Panel

Figure 1:
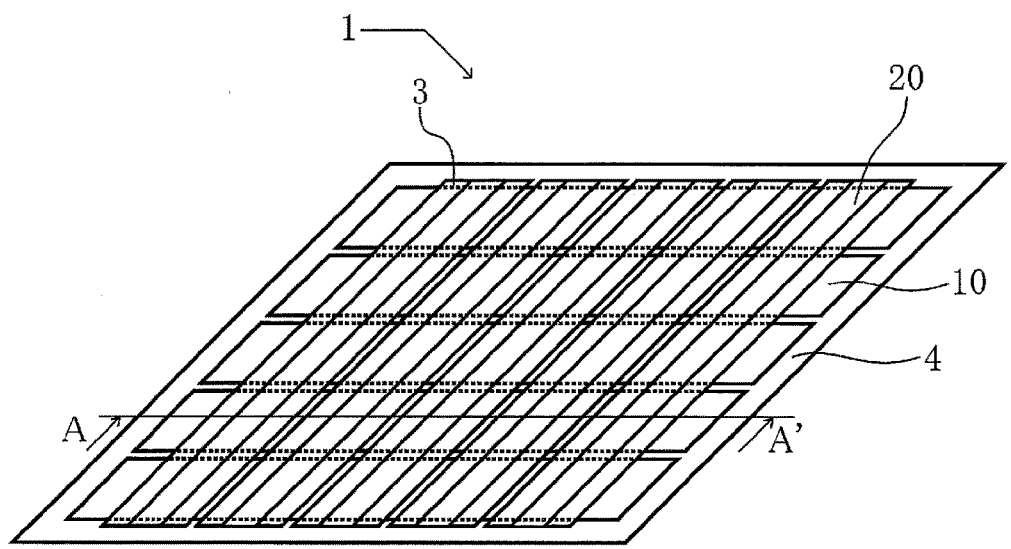
FIG. 1 is a perspective view showing one embodiment of a touch panel relating to the present invention.
Figure 2:
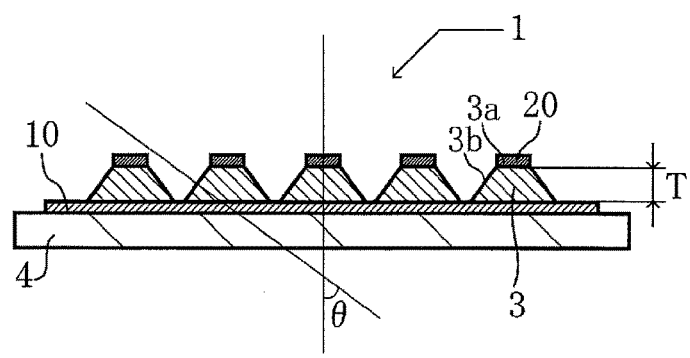
FIG. 2 is a section view of the touch panel shown in FIG. 1 taken along an electrode laminating direction.

Firstly, a configuration of a touch panel according to this embodiment will be explained. FIG. 1 is a perspective view showing one embodiment of a touch panel relating to the present invention, and FIG. 2 is a section view of the touch panel shown in FIG. 1 taken along an electrode laminating direction.

As shown in FIG. 1, a touch panel 1 includes a substrate 4, a plurality of lower electrodes 10 provided in a form of bands and arranged parallel with each other along an X direction, a plurality of upper electrodes 20 provided in a form of bands and arranged parallel with each other along a Y direction to intersect (perpendicular to) the respective lower electrodes, and an insulating film 3 arranged between the upper electrodes 20 and the lower electrodes 10 to support the upper electrodes 20. Incidentally, in this embodiment, the insulating film 3 is provided in the form of a band for each one of the upper electrodes 20 and a spacing is provided between adjacent insulating film 3 bands.

The substrate 4 is a substrate having electric insulating property and can be a glass substrate, a PET (polyethylene terephthalate) film, a PC (polycarbonate) film, a COP (cycloolefin polymer) film, a PVC (polyvinylchloride) film, a COC (cycloolefin copolymer) film, etc. Among the above, a COP film is preferred as this has not only good optical isotropy, but also good dimensional stability as well as good working precision. Incidentally, when the transparent substrate 4 comprises a glass substrate, its thickness should range from 0.3 mm to 3 mm. Further, when the transparent substrate 4 comprises a resin film, its thickness should range from 20 µm to 3 mm.

Further, as shown in FIG. 1, in the electrode pattern of the touch panel 1, in order to eliminate noise influence from LCD, the lower electrode 10 has a large width, and a spacing 11 between adjacent lower electrodes 10 is set narrow enough to ensure mutual electric insulation.

On the other hand, in order to ensure detection ability, the upper electrode 20 has a narrow width as compared with the lower electrode 10 and a spacing 21 between adjacent upper electrodes 20 is set large. As explained hereinbefore with reference to FIG. 10, in the touch panel 1, there is formed an electric field whose electric force lines L extend from the transmitter-side lower electrode 10 (corresponding to the electrode 510 in FIG. 10) toward the receiver-side upper electrode 20 (corresponding to the electrode 520 in FIG. 10). Therefore, if the spacing 21 between adjacent upper electrodes 20 were formed as narrow as the spacing 11 between adjacent lower electrodes 10, even when an object 200 such as a finger approaches the upper electrode 20, the electric force lines L might not be able to pass the spacing 21 between the upper electrodes 20 toward the object 2. That is, no change may occur in the mutual capacitance, thus detection of approaching or touching of the object 200 to/with the touch surface side may be disabled. Therefore, in this invention too, in the touch panel 1, the spacing 21 between the upper electrodes 20 needs to be formed wider than the spacing 11 between the lower electrodes 10.

As an example of transparent conductive material constituting the upper electrodes 20 and the lower electrodes 10, a material comprising a photo-curing resin binder and conductive nano fibers can be cited. As some examples of the conductive nano fibers, there can be cited a metal nano wire made by continuous extrusion with applying a voltage or current from a leading end portion of a probe on a surface of a precursor carrying a metal ion such as gold, silver, platinum, copper, palladium or the like and a peptide nano fiber formed by addition of gold particles to nano fibers formed by self organization of a peptide or a derivative thereof. Further, even a blackish conductive nano fiber such as carbon nanotube too can be used if a difference of color or reflectivity relative to a shadow is recognizable. Further, as examples of photo-curing resin binder, urethane acrylate, cyanoacrylate, etc. can be cited. Further, this can be formed also of conductive polymer such as PEDOT (polyethylene dioxythiophene) etc.

The insulating film 3 is formed of a photosensitive resin having adhesiveness and includes a support face 3*a* for supporting the upper electrode 20 and a sloped side face 3*b* sharing a long side with the support face 3*a* (see FIG. 1, FIG. 2).

The insulating film 3 is provided for holding the electrode 20 on the substrate 4 and keeping insulation between the upper electrode 20 and the lower electrode 10. Further, in the manufacturing process of the touch panel 1, the insulating film 3 contributes to patterning of the conductive layer to form the upper electrodes 20.

As a material constituting the insulating film 3, a resin prepared by adding photo-curing property to a heat-sensitive or pressure-sensitive adhesive resin can be used. For instance, acrylic resin, styrene resin, epoxy resin, amido resin, amido epoxy rein, alkyd resin, phenol resin, ester resin, urethane resin, epoxy acrylate resin obtained by a reaction between an epoxy resin and a (meta) acrylate, an acid-modified epoxy acrylate resin obtained by a reaction between an epoxy acrylate resin and an acid anhydride, etc. can be cited.

The thickness (T) of the insulating film 3 at its support face 3*a* preferably ranges from 3 to 15 µm. If the thickness (T) is less than 3 µm, it becomes difficult to maintain insulation between the upper electrode 20 and the lower electrode 10. Also, if the thickness (T) is greater than 15 µm, it will take a longer period to allow sufficient curing in patterning a conductive layer for forming the upper electrode 20.

The above arrangement of the insulating film 3 having the support face 3*a* for supporting the upper electrode 20 and the sloped side face 3*b* sharing a long side with the support face 3*a* renders a change (transition) in the refractive index between the portion where the upper electrode 20 is formed and the portion where no upper electrode 20 is formed gentler and smoother, whereby the boundary of the upper electrode 20 becomes less conspicuous. Therefore, in the touch panel, the visible-pattern phenomenon of an electrode pattern of upper electrodes can be lessened.

The sloped side face 3*b* of the insulating film 3 has such a slope that the section of the insulating film 3 progressively increases in its width from the upper side toward the lower side of this sloped side face 3*b*. More particularly, preferably, a normal line (A) at the center portion of the sloped side face 3*b* and a normal line (B) of the support face 3*a* for the upper electrode 20 form a slope θ ranging from 20 to 30 degrees therebetween. If the slope θ is greater than 30 degrees, sharpness will be lost in the long side of the support face and in the lateral edge of the upper electrode 20 when the upper electrode 20 is to be formed by patterning a conductive layer to be described later. As a result, it will become difficult to obtain uniformity of shape among the upper electrodes 20. Conversely, if the slope θ is smaller than 20 degrees, the resultant configuration will become similar to the conventional configuration, so that the visible-pattern phenomenon lessening effect will be smaller.

The sloped side face 3*b* of the insulating film 3 is formed to have a straight section in the example shown in FIG. 2. Incidentally, the sloped side face 3*b* can also be formed like a convex face or a concave face, rather than the straight section shape.

(Method of Forming Upper Electrode and Sloped Side Face)

Next, with reference to the accompanying drawings, there will be explained a method of forming the electrode pattern of the upper electrode 20 and the sloped side face 3*b* of the insulating film 3 in this embodiment.

FIG. 3 is a section view showing one example of step of forming the electrode pattern of the upper electrodes and sloped side faces of the insulating film. Specifically, the method includes: a step of laminating a photosensitive conductive film (dry film resist) 114 including a support film 111, a conductive layer 112 laminated on the support film 111, and a photosensitive resin layer 113 laminated on the conductive layer 112 and having adhesiveness on the lower electrode 10 side face of the substrate 4 on which the lower electrodes 10 are formed with placing the photosensitive resin layer 113 being placed in gapless contact therewith (see FIG. 3A); an exposing step for irradiating active beam L2 onto a predetermined portion of the photosensitive resin layer 113 on the substrate 4 (see FIG. 3B); and a developing step for forming a conductive pattern by developing the exposed photosensitive resin layer 113 (see FIG. 3C).

The support film 111 is a plastic film having a surface with a releasing treatment. As some examples of the plastic film, there can be cited a polytetrafluoroethylene film, a polyethylene terephthalate film, a polyethylene film, a polypropylene film, a polymethylpentene film, a polyimide film, etc. Among these, a biaxially oriented polyethylene terephthalate film is particularly preferred for its superior dimensional stability. A biaxially oriented polyethylene terephthalate film with a releasing treatment is commercially available and can be used as the plastic film. The releasing treatment can be silicone type releasing treated surface or can be a non-silicone type releasing treated surface also.

Material for constituting the conductive layer 112 is comprised of a material similar to that employed for the upper electrodes 20 and the lower electrodes 10. Material for constituting the photosensitive resin layer 113 is comprised of a material similar to that employed for the insulating film 3.

The laminating step can be implemented e.g. by a method according to which the photosensitive conductive film 114 after removable of a protective film if any thereon is heated and at the same time the photosensitive resin layer 113 side is pressure-bonded to the substrate 4 and the lower electrode 10 to be laminated therewith. Incidentally, in this operation, laminating should preferably be carried out under a reduced pressure for the sake of better adhesiveness and followability.

As an example of exposing method employed at the exposing step, a mask exposing method can be cited. As a beam source of the active beam L2, any known beam source, such as a carbon arc lamp, a mercury vapor arc lamp, an ultrahigh pressure mercury lamp, a high pressure mercury lamp, a xenon lamp, which can effectively emit ultraviolet beam, visible beam, or the like can be used. Moreover, a beam source such as an Ar ion laser, a semiconductor laser, which can effectively emit ultraviolet beam, visible beam, or the like can also be used. Further, a beam source such as a photographic flood electric lamp, a sun lamp, which can effectively emit visible beam can be used also.

Referring to the shape of the mask 5 used for the exposure, the mask 5 includes a plurality of light transmitting portions 5a formed by punching in correspondence with the above-described upper electrodes 20, a light shielding portion 5d for covering the portion where the above-described insulating film 3 is not formed, and gradation portions 5b covering the portions corresponding to the above-described sloped side faces 3b for progressively varying the exposure amounts (see FIG. 4).

With use of the above-described mask 5, the exposure amount of the un-cured photosensitive resin layer 113 will be controlled for the respective portions thereof. More particularly, a portion of the photosensitive resin layer 113 masked by the light transmitting portion 5a of the mask 5 is cured, whereas a portion of the photosensitive resin layer 113 masked by the light shielding portion 5d of the mask 5 will be left un-cured. And, a portion of the photosensitive resin layer 113 masked by the gradation portion 5b will be semi-cured such that its curing degree progressively decreases in the direction away from the light transmitting portion 5a.

Incidentally, by a direct drawing method using e.g. the laser exposure technique or the like, a method of directly irradiating the active beam L2 as same pattern as the mask exposure method can be used also.

In case the support film 111 on the conductive layer 112 is transparent to the active beam, the active beam L2 can be irradiated through this support film 111. Conversely, in case the support film 111 is of the light shielding type, the active beam L2 will be irradiated on the photosensitive resin layer 113 after removal of this support film 111.

Further, in case the substrate 4 is transparent to the active beam, the active beam L2 can be irradiated through this substrate from the substrate 4 side. However, for the sake of better resolution, it is preferred that the active beam L2 be irradiated on the conductive layer 112 and the photosensitive resin layer 113 from the conductive layer 112 side.

At the developing step in this embodiment, the photosensitive resin layer 113 is removed by an amount in inverse proportion to the exposure amount. More particularly, in case a transparent support film 111 is present on the conductive layer 112, firstly, the support film 111 will be removed and then, the photosensitive resin layer 113 will be removed by an amount in inverse proportion with the exposure amount by the wet developing technique. With this, the cured portion of the photosensitive resin layer 113 which portion has been masked by the light transmitting portion 5a of the mask 5 will remain together with the conductive layer 112 thereon, thus forming the support face 3a of the insulating film 3 supporting the upper electrode 20. Further, the un-cured portion which has been masked by the light shielding portion 5d of the mask 5 will be removed together with the conductive layer 112 thereon, so no insulating film 3 will be formed.

And, in the semi-cured portion which has been masked by the gradation portion 5b, the conductive layer 112 present thereon will be removed, but the insulating film 3 will be left by an amount corresponding to its curing degree, so that the sloped side face 3b of the insulating film 3 will be formed. Incidentally, the semi-cured portion will be deformed in the form of collapsing at the time of developing, so that a change thereof in the horizontal direction will be converted into a change in the vertical (thickness) direction and the conductive layer 112 in the semi-cured portion can be removed entirely.

The wet developing will be effected by a known technique such as spraying, rocking dipping, brushing, scrapping, etc. with using a developing solution corresponding to the photosensitive resin, such as an alkaline aqueous solution, a water-based developing solution, an organic solvent based developing solution, etc.

As the developing solution, a solution such as an alkaline aqueous solution, which is safe and stable and also has good operability, will be used. As a base constituting the alkaline aqueous solution, e.g. alkali hydroxide such as hydroxide of lithium, sodium or potassium, or alkaline carbonate such as carbonate or bicarbonate of lithium, sodium, potassium or ammonium, etc., alkaline metal phosphate such as potassium phosphate, sodium phosphate, or alkaline metal pyrophosphate, such as sodium pyrophosphate, potassium pyrophosphate, can be used. Further, a water-based developing solution consisting of water or alkaline aqueous solution and one or more kinds of organic solvent can also be used. Further, the above-described developing solutions can be used in combination of two or more kinds, when necessary.

As some examples of method of development, dipping technique, battling technique, spraying technique, brushing technique, slapping technique, etc. can be cited. Among these, using a high-pressure spraying technique is preferred for the sake of improvement of resolution.

In the method of forming the pattern of the upper electrodes 20 and the sloped side face 3b of the insulating film 3 in this embodiment, after the development, when needed, exposure can be effected for additional curing of the upper electrodes 20 and the insulating film 3.

Incidentally, for formation of the lower electrodes 10 on the substrate 4, any known technique can be employed. For instance, an electrode pattern of the lower electrodes 10 can be formed directly onto the substrate 4 by a printing technique such as screen printing, gravure printing, ink jet printing with use of an ink constituting the above-described transparent conductive material. Alternatively, after a transparent conductive layer is formed by a coating technique such as dip coating, spin coating, roll coating, spray coating, unnecessary portions can be removed by etching or the like. Further alternatively, the electrode pattern of the lower electrodes 10 can be formed by effecting exposure and development with using a photosensitive conductive film (dry film resist) disclosed in Patent Document 2.

Second Embodiment

In the case of the example of touch panel 1 in the first embodiment, the insulating film 3 is formed for each of the upper electrodes 20. However, the present invention is not limited thereto. For instance, an insulating film 30 can be formed as one continuous film (second embodiment).

(Configuration of Touch Panel)

Figure 5:
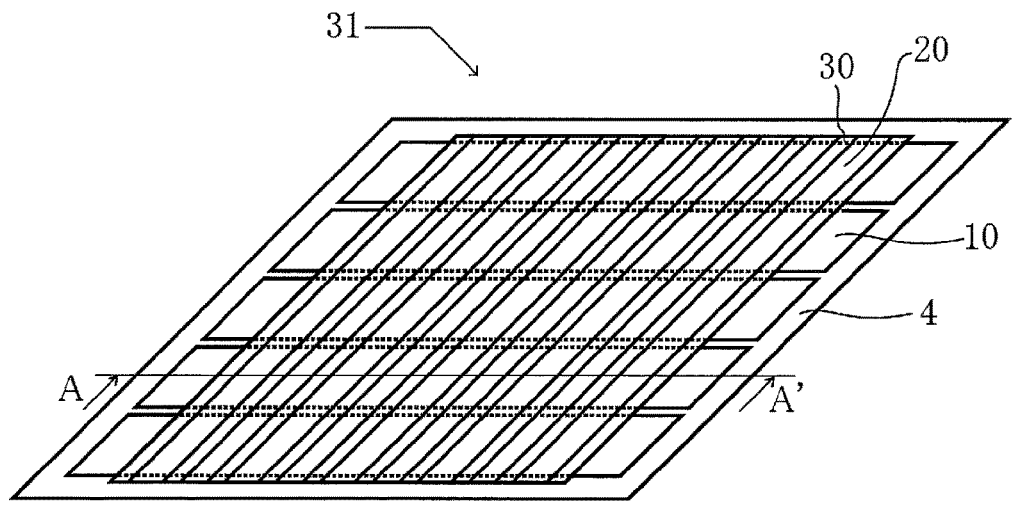
FIG. 5 is a perspective view showing a further embodiment of a touch panel relating to the present invention.
Figure 6:
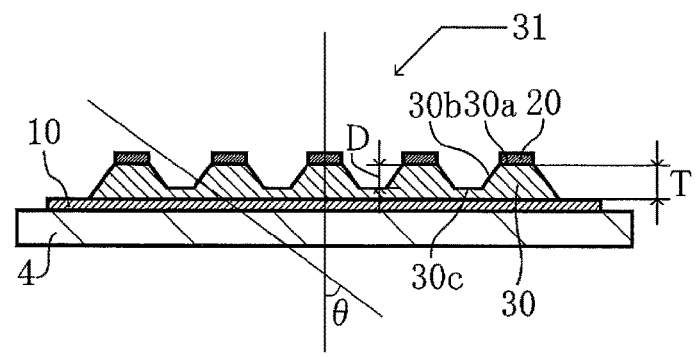
FIG. 6 is a section view of the touch panel shown in FIG. 5 taken along an electrode laminating direction.

Next, a configuration of a touch panel 31 according to this embodiment will be explained. Incidentally, the same features as those of the touch panel 1 disclosed in the first embodiment will be denoted with the same reference numerals and explanation thereof will be omitted. Next, only differences from the touch panel 1 of the first embodiment will be explained. FIG. 5 is a perspective view showing a further embodiment of the touch panel relating to the present invention. FIG. 6 is a section view of the touch panel shown in FIG. 5 taken along an electrode laminating direction.

As shown in FIG. 5, the touch panel 31 includes a substrate 4, a plurality of lower electrodes 10 provided in a form of bands and arranged parallel with each other along an X direction, a plurality of upper electrodes 20 provided in a form of bands and arranged parallel with each other along a Y direction to intersect (perpendicular to) the respective lower electrodes, and an insulating film 30 arranged between the upper electrodes 20 and the lower electrodes 10 to support the upper electrodes 20. Incidentally, in this embodiment, the insulating film 30 is provided in the form of one continuous film having no spacing (gap) provided in the first embodiment.

The insulating film 30 is formed of a photosensitive resin having adhesiveness and includes a support face 30a for supporting the upper electrode 20, a sloped side face 30b sharing a long side with the support face 30a, and a recessed bottom face 30c interconnecting lower sides of the sloped side faces 30b (see FIG. 5, FIG. 6).

The insulating film 30 is provided for holding the electrode 20 on the substrate 4 and for keeping insulation between the upper electrode 20 and the lower electrode 10 like the insulating film 3 in the first embodiment. Further, in the manufacturing process of the touch panel 1, the insulating film 30 contributes to patterning of the conductive layer to form the upper electrodes 20 also.

Material constituting the insulating film 30, its thickness and the slope θ of the sloped side face 3b are same as those of the insulating film 3 in the first embodiment.

The above arrangement of the insulating film 30 having the support face 30a for supporting the upper electrode 20 and the sloped side face 30b sharing a long side with the support face 30a renders a change (transition) in the refractive index between the portion where the upper electrode 20 is formed and the portion where no upper electrode 20 is formed gentler and smoother, whereby the boundary of the upper electrode 20 becomes less conspicuous. Therefore, in the touch panel 31, like the first embodiment, the visible-pattern phenomenon of an electrode pattern of upper electrodes 20 can be lessened.

Further, as the insulating film 30 is formed as one continuous film having no spacing (gap) provided in the first embodiment, within the portion where no upper electrode 20 is formed, change of refractive index is rendered even more gentle, whereby the boundary of the upper electrode 20 can be even less conspicuous in a natural manner.

The sloped side face 30b of the insulating film 30 is formed to have a straight section in the example shown in FIG. 6. Incidentally, the sloped side face 30b can also be formed like a convex face or a concave face, like the insulating film 3 of the first embodiment.

Incidentally, in this embodiment, the height difference (D) from the upper side to the lower side of the sloped side face 30b should preferably be 1 μm or more. If the thickness (T) of the support face 30a of the insulating film 30 exceeds 3 μm, it will be possible to maintain sufficient insulation between the upper electrode 20 and the lower electrode 10 as described hereinbefore in the explanation of the first embodiment. However, if the height difference (D) from the upper side to the lower side of the sloped side face 30b is less than 1 μm, it will become difficult to control the curing degree at the time of forming the upper electrode 20 through patterning of the conductive layer.

(Method of Forming Upper Electrode and Sloped Side Face)

Next, with reference to the accompanying drawings, there will be explained a method of forming the electrode pattern of the upper electrode 20 and the sloped side face 3b and the recessed bottom face 30c of the insulating film 30 in this embodiment. Incidentally, the same features as the forming process disclosed in the first embodiment will be denoted with same reference numerals and explanation thereof will be omitted.

Figure 7A:
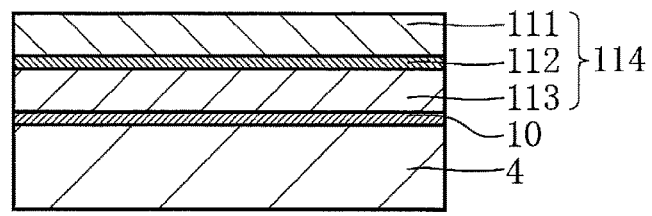
FIG. 7 is a view showing another example of step of forming upper electrodes and sloped side faces.
Figure 7B:
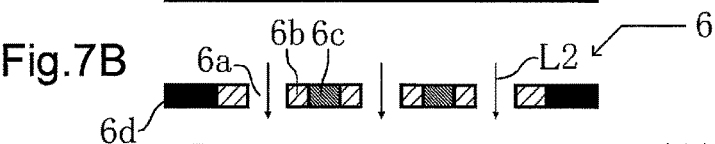
Figure 7C:
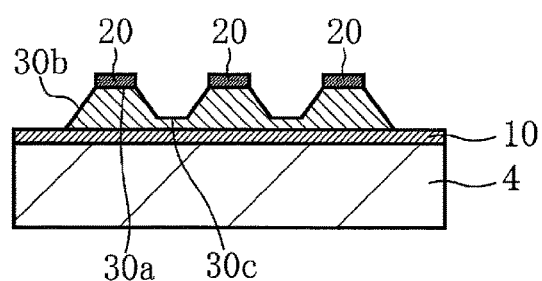

FIG. 7 is a section view showing one example of step of forming electrode pattern of the upper electrodes and sloped side faces of the insulating film. Specifically, the method includes a step of laminating a photosensitive conductive film (dry film resist) 114 as used in the first embodiment on the lower electrode 10 side face of the substrate 4 on which the lower electrodes 10 are formed with placing the photosensitive resin layer 113 being placed in gapless contact therewith (see FIG. 7A); an exposing step for irradiating active beam L2 onto a predetermined portion of the photosensitive resin layer 113 on the substrate 4 (see FIG. 7B); and a developing step for forming a conductive pattern by developing the exposed photosensitive resin layer 113 (see FIG. 7C).

The laminating step in this embodiment is same as that of the first embodiment.

Figure 8:
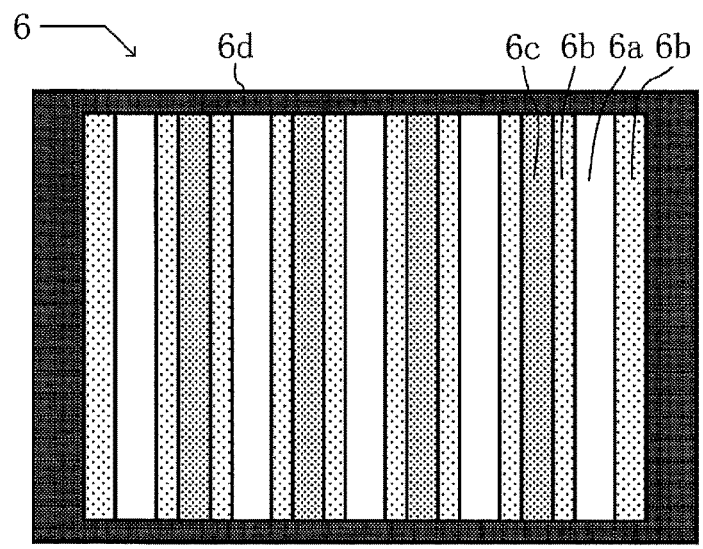
FIG. 8 is a plane view of a mask used at an exposing step shown in FIG. 7.
Figure 9:
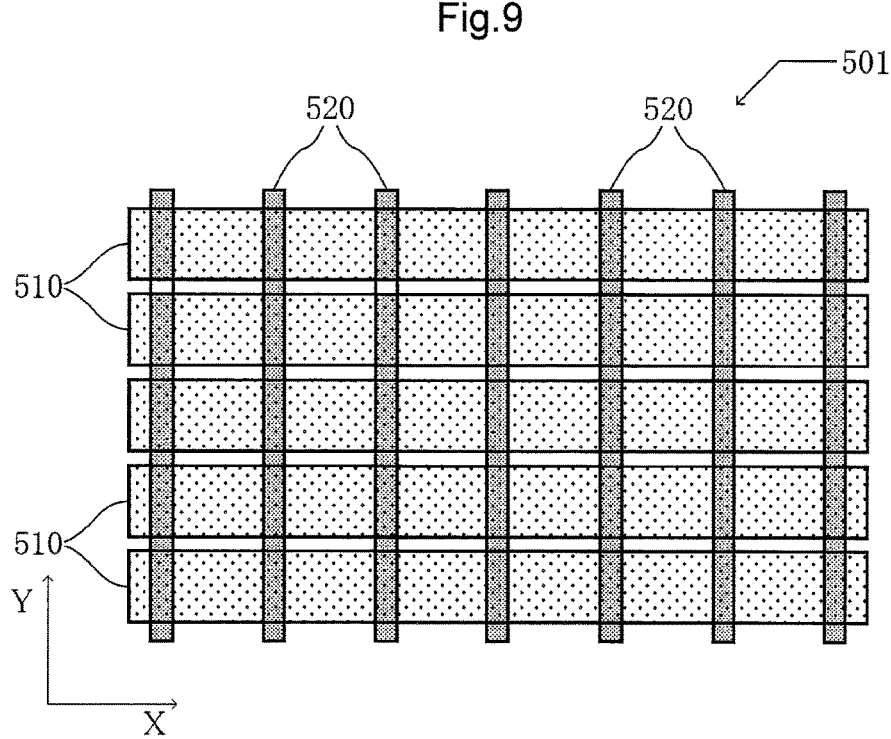
FIG. 9 is a schematic diagram of an electrode pattern of a touch panel.
Figure 11A:
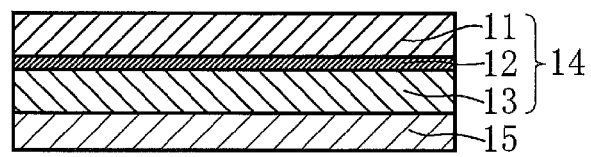
FIG. 11 is a view showing a conventional forming step of an electrode pattern using a dry film resist.
Figure 11B:
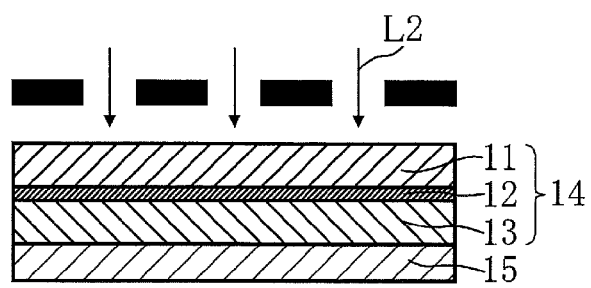
Figure 11C:
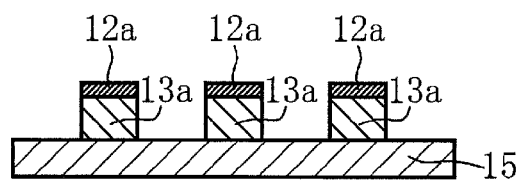
Figure 12:
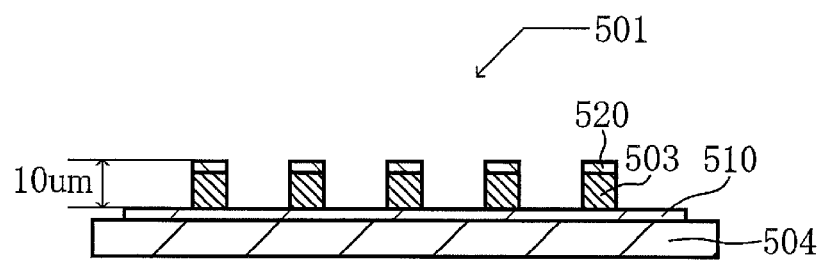
FIG. 12 is a section view showing a touch panel employing the electrode pattern forming method illustrated in FIG. 11.

The exposing step of this embodiment differs in the mask used from that used in the first embodiment. Referring to the shape of the mask 6 used in this embodiment, the mask 6 includes a plurality of light transmitting portions 6a formed by punching in correspondence with the above-described upper electrodes 20, a light shielding portion 6d for covering the portion where the above-described insulating film 30 is not formed, low light transmitting portions 6c covering portions corresponding to recessed bottom faces 30c of the insulating film 30 thus providing low exposure amounts therefor, and gradation portions 6b covering the portions corresponding to the above-described sloped side faces 30b of the insulating film 30 for progressively varying the exposure amounts among the light transmitting portion 6a and the low light transmitting portions 6c (see FIG. 8).

With use of the above-described mask 6, a portion of the photosensitive resin layer 113 masked by the light transmitting portion 6a of the mask 6 is cured, whereas a portion of the photosensitive resin layer 113 masked by the light shielding portion 6d of the mask 6 will be left un-cured. In addition, a portion of the photosensitive resin layer 113 masked by the low light transmitting portion 6c will be semi-cured to a predetermined curing degree, and a portion of the photosensitive resin layer 113 masked by the gradation portion 6b will be semi-cured such that its curing degree progressively decreases in the direction away from the light transmitting portion 5a.

At the developing step in this embodiment, the cured portion of the photosensitive resin layer 113 which portion has been masked by the light transmitting portion 6a of the mask 6 will remain together with the conductive layer 112 thereon, thus forming the support face 30a of the insulating film 30 supporting the upper electrode 20. Further, the un-cured portion which has been masked by the light shielding portion 6d of the mask 6 will be removed together with the conductive layer 112 thereon, so no insulating film 30 will be formed.

And, in the semi-cured portion which has been masked by the low light transmitting portion 6c, the conductive layer 112 present thereon will be removed, but the insulating film 30 will be left by an amount corresponding to its curing degree, thus forming the recessed bottom face 30c of the insulating film 30. Incidentally, the semi-cured portion which has been masked by the low light transmitting portion 6c will be deformed in the form of collapsing at the time of developing, thus enabling removal of the conductive layer 112 thereon entirely.

And, in the semi-cured portion which has been masked by the gradation portion 6b, the conductive layer 112 present thereon will be removed, but the insulating film 30 will be left by an amount corresponding to its curing degree, thus forming the sloped side face 30b of the insulating film 30. Incidentally, the semi-cured portion which has been masked by the gradation portion 6b will be deformed in the form of collapsing at the time of developing, so that a change thereof in the horizontal direction will be converted into a change in the vertical (thickness) direction and the conductive layer 112 thereon can be removed entirely.

INDUSTRIAL APPLICABILITY

The present invention is applicable to a mutual capacitance touch panel configured to detect a position on the panel touched by an operating object such as a finger by the mutual capacitance technique and can be used in an electronic device having a touch panel, represented by a smart phone, an electronic book reader (e-book reader), a personal computer.

DESCRIPTION OF REFERENCE MARKS 1, 31, 501 touch panel (mutual capacitance touch panel)
3, 30, 503 insulating film
3a, 30a support face
3b, 30b sloped side face
30c recessed bottom face
4, 15, 504 substrate
5, 6 mask
5a, 6a light transmitting portion
5b, 6b gradation portion
5d, 6d light shielding portion
6c low light transmitting portion
10, 510 lower electrode
20, 520 upper electrode
11, 111 support film
12, 112 conductive layer
13, 113 photosensitive resin layer
14, 114 photosensitive conductive film
200 object (e.g. a finger)

The invention claimed is:

1. A mutual capacitance touch panel comprising:
a substrate;
a plurality of lower electrodes provided in a form of wide bands formed of transparent conductive material and arranged parallel with each other and with narrow spacing therebetween along a first direction on a first face of the substrate;
a plurality of upper electrodes provided in a form of narrow bands formed of transparent conductive material and arranged parallel with each other and with wide spacing therebetween along a second direction intersecting the first direction on the first face of the substrate and on the lower electrodes; and
an insulating film formed of photosensitive resin having adhesiveness and arranged between the upper electrodes and the lower electrodes to support the upper electrodes, the insulating film including a sloped side face sharing a long side with a support face which supports the upper electrode.

2. The mutual capacitance touch panel according to claim 1,
wherein the insulating film at a portion thereof supporting the upper electrode has a thickness (T) ranging from 3 to 15 µm.

3. The mutual capacitance touch panel according to claim 2, wherein the insulating film is formed for each one of the upper electrodes.

4. The mutual capacitance touch panel according to claim 2,
wherein the insulating film is formed as one continuous film and includes a recessed bottom face interconnecting lower sides of the sloped side faces.

5. The mutual capacitance touch panel according to claim 4, wherein the sloped side face includes an upper side and a lower side and a height difference (D) between the upper side and the lower side is 1 µm or more.

6. The mutual capacitance touch panel according to claim 1, wherein a normal line at a center portion of the sloped side face and a normal line of the support face form a slope θ ranging from 20 to 30 degrees therebetween.

7. The mutual capacitance touch panel according to claim 1, wherein the insulating film is formed for each one of the upper electrodes.

8. The mutual capacitance touch panel according to claim 1, wherein the insulating film is formed as one continuous film and includes a recessed bottom face interconnecting lower sides of the sloped side faces.

9. The mutual capacitance touch panel according to claim 8, wherein the sloped side face includes an upper side and a lower side and a height difference (D) between the upper side and the lower side is 1 µm or more.

* * * * *